(12) United States Patent
Nelson

(10) Patent No.: US 10,121,214 B2
(45) Date of Patent: Nov. 6, 2018

(54) SURVEY PLAT DOCUMENTS AND METHOD FOR MAKING SURVEY PLAT DOCUMENTS

(71) Applicant: James R. Nelson, North Branch, MN (US)

(72) Inventor: James R. Nelson, North Branch, MN (US)

( * ) Notice: Subject to any disclaimer, the term of this patent is extended or adjusted under 35 U.S.C. 154(b) by 637 days.

(21) Appl. No.: 14/682,309

(22) Filed: Apr. 9, 2015

(65) Prior Publication Data

US 2016/0300510 A1    Oct. 13, 2016

(51) Int. Cl.
| | | |
|---|---|---|
| *G06Q 50/16* | (2012.01) | |
| *B32B 7/12* | (2006.01) | |
| *B32B 37/12* | (2006.01) | |
| *B32B 27/36* | (2006.01) | |
| *G03C 11/08* | (2006.01) | |
| *B32B 27/08* | (2006.01) | |
| *B32B 27/30* | (2006.01) | |
| *G03C 1/795* | (2006.01) | |
| *B32B 37/24* | (2006.01) | |

(52) U.S. Cl.
CPC .............. *G06Q 50/165* (2013.01); *B32B 7/12* (2013.01); *B32B 27/08* (2013.01); *B32B 27/304* (2013.01); *B32B 27/36* (2013.01); *B32B 37/12* (2013.01); *G03C 11/08* (2013.01); *B32B 2037/243* (2013.01); *B32B 2255/10* (2013.01); *B32B 2264/10* (2013.01); *B32B 2307/408* (2013.01); *B32B 2307/4023* (2013.01); *B32B 2307/412* (2013.01); *B32B 2307/518* (2013.01); *B32B 2307/71* (2013.01); *B32B 2307/712* (2013.01); *B32B 2307/7265* (2013.01); *B32B 2429/00* (2013.01); *B32B 2554/00* (2013.01); *G03C 2001/7958* (2013.01)

(58) Field of Classification Search
CPC ........ G06Q 50/165; B32B 7/12; B32B 37/12; B32B 27/36; B32B 27/304; B32B 27/08; B32B 2307/71; B32B 2307/518; B32B 2307/412; B32B 2307/408; B32B 2307/4023; B32B 2264/10; B32B 2255/10; B32B 2037/243; B32B 2554/00; B32B 2429/00; B32B 2307/7265; B32B 2307/712; G03C 11/08; G03C 2001/7958
USPC ......... 281/3.1, 4, 38, 45; 283/23, 26, 34, 35, 283/74, 94, 95, 98, 109
See application file for complete search history.

(56) References Cited

U.S. PATENT DOCUMENTS

| | | |
|---|---|---|
| 3,035,916 A | 5/1962 | Heiart |
| 3,143,421 A | 8/1964 | Nadeau et al. |
| 3,178,287 A | 4/1965 | Sweet et al. |
| 3,214,274 A | 10/1965 | Ohyama et al. |
| 3,397,980 A | 8/1968 | Stone |

(Continued)

FOREIGN PATENT DOCUMENTS

| | | |
|---|---|---|
| EP | 0638019 | 2/1995 |
| EP | 0845707 | 6/1998 |

*Primary Examiner* — Justin V Lewis
(74) *Attorney, Agent, or Firm* — Thomas J. Nikolai; Nikolai & Mersereau, P.A.

(57) ABSTRACT

Survey plat documents which are not susceptible to intentional alteration or damage due to environmental conditions are made using a photographic process. A transparent photographic film is exposed and photographically processed to capture the image of a plat drawing and then protected by applying clear laminates to each side of the film using a permanent, clear adhesive.

8 Claims, 2 Drawing Sheets

(56) References Cited

U.S. PATENT DOCUMENTS

| | | | |
|---|---|---|---|
| 3,676,241 A * | 7/1972 | Plumly | G09B 29/004 |
| | | | 156/59 |
| 3,871,119 A | 3/1975 | Mayer | |
| 4,077,830 A | 3/1978 | Fulwiler | |
| 4,181,528 A | 1/1980 | Work, III et al. | |
| 4,305,768 A | 12/1981 | Lontz | |
| 4,378,392 A | 3/1983 | Segel | |
| 4,464,454 A | 8/1984 | Vogt | |
| 4,581,267 A | 4/1986 | Miller | |
| 4,635,965 A | 1/1987 | Vogt | |
| 4,701,809 A | 10/1987 | Barrett | |
| 4,971,893 A | 11/1990 | Taylor, Jr. | |
| 5,085,907 A | 2/1992 | Smith | |
| 5,595,794 A | 1/1997 | Cesar | |
| 5,667,935 A | 9/1997 | Hou | |
| 7,045,199 B2 | 5/2006 | Yamamoto et al. | |
| 7,691,470 B2 | 4/2010 | Goodson et al. | |
| 7,824,029 B2 | 11/2010 | Jones et al. | |
| 8,551,387 B2 | 10/2013 | Feldman et al. | |
| 2012/0242073 A1 | 9/2012 | Mills | |

\* cited by examiner

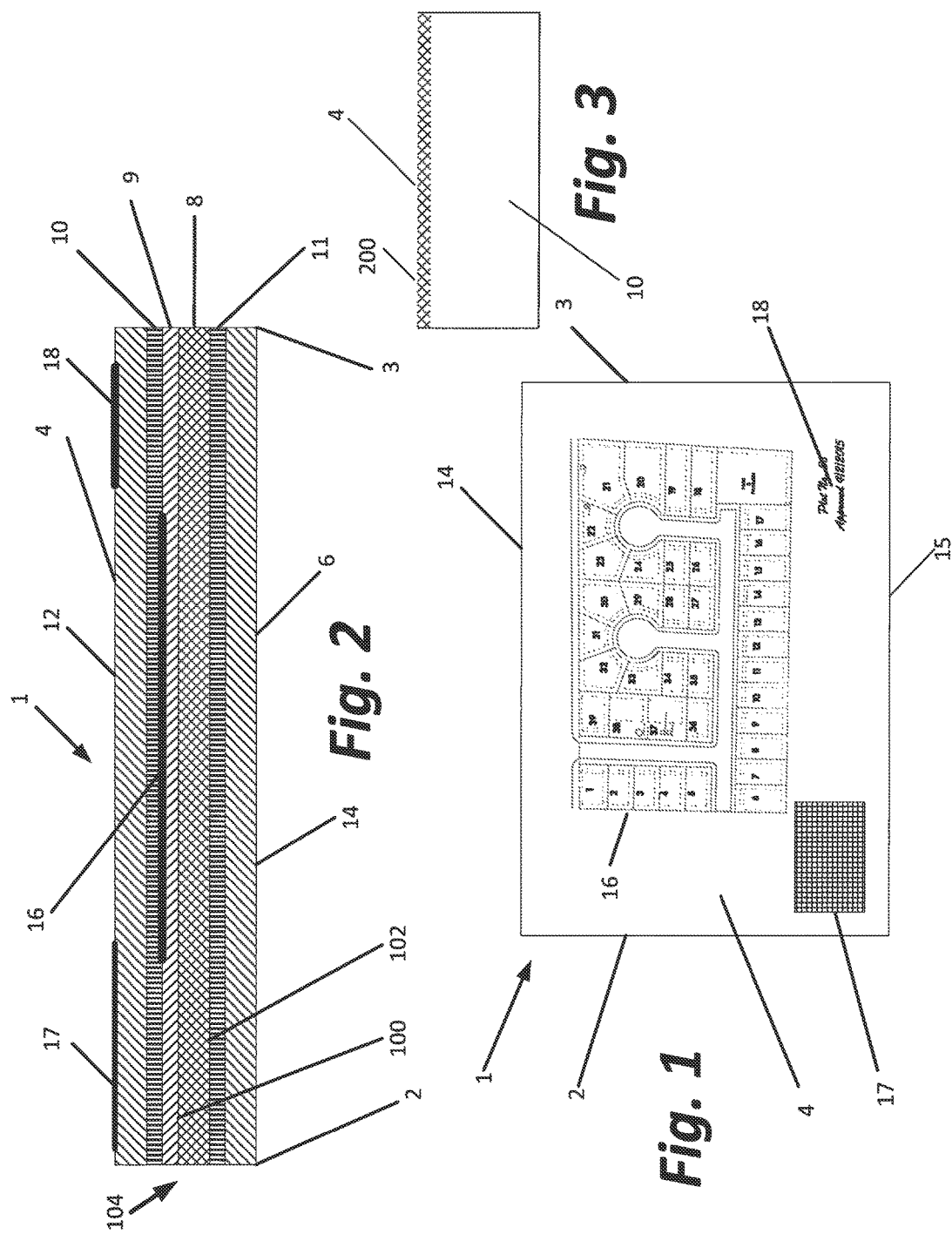

SURVEY PLAT DOCUMENTS AND METHOD FOR MAKING SURVEY PLAT DOCUMENTS

CROSS-REFERENCED TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to survey plat documents. More specifically, the present invention relates to a composition and method for creating durable survey plat documents.

2. Background of the Prior Art

A survey plat is a plan or map of an area of land which is a proposed site for construction. More specifically, a survey plat is a map drawn to scale, showing the divisions of a piece of land. Given the value of real estate, the possibility of disputes related to ownership and boundaries and the needs of the Federal, State and local governments, plats must be carefully created and documented. Such documents must be preserved for many years.

Many governments have enacted statutes regulating how plats are to be documented to ensure plat records are preserved. For example, Minnesota Statute 505.021 requires that a plat be prepared on 4 mil transparent reproducible film or the equivalent and that it be prepared by a photographic process. This statute also specifies the length and width of the sheet size of the plat document, specifically, 22 inches by 34 inches. This statute even regulates borders used on the document and how the sheets of multiple sheet plats are to be numbered.

A number of problems exist when a photographic process is use to document plats. First, portions of a photographic image are susceptible to being scratched off the film bearing the image. This can occur due to normal wear. This can also occur as a result of purposeful efforts to alter the image. Second, it is often desirable to stamp the plat document with a date stamp, a notarial stamp, or the like. The ink used often does not bond well to film bearing the image of the plat resulting in smearing of the stamped information making it illegible. Third, government officials and others may find it necessary or desirable to make notations on the document. Also, such officials routinely sign such documents to make the documents "official". The ink used to make such notes or to sign may not bond well to the image or film bearing the image causing the notes to smear.

In view of the foregoing, there is a real need for survey plat documents and a process for creating survey plat documents which meet the requirements of the aforementioned statutes and which overcome the problems described above.

SUMMARY OF THE INVENTION

A survey plat document meeting all of the requirements of such statutes and overcoming the above-described problems includes a base layer comprising a polyester film which has been coated with a light-sensitive photo emulsion coating. After the photo emulsion coating has been exposed and processed so that it bears an image of a platdrawing, a matte laminate is applied to the front and back of the film using a permanent adhesive. The matte laminate may be made of polyvinylchloride (PVC) and serves not only to protect the image on the film, but also serves as a substrate which is receptive to the inks typically used to stamp, sign or make notes on survey plat documents.

The process used to create such survey plat documents begins by creating a plat drawing on wide format paper which conforms to the applicable legal requirements. The plat drawing must then be transferred to a reprographic service bureau, otherwise referred to herein as a "photo processor". This can be done by sending the original drawing to the photo processor or by scanning the drawing to create a digital file, such as a jpeg or PDF file, and sending the digital file to the photo processor. If a digital file is sent to the photo processor, the photo processor will print the image in the digital file onto wide format paper complying with the statute.

Next, a reduced size photographic negative of the original or printed drawing is created. If the negative contains any unwanted images, they are removed from the negative. Using the negative and a camera, the image is projected onto the light-sensitive photo emulsion coating of the durable clear polyester film. After the film is exposed, it is processed by submerging the film in a photographic developer tank, then in a chemical fixative tank and finally into a wash tank. The film is then dried.

After the film has been dried, a transparent laminate is applied using a clear, permanent adhesive to both the front and back of the film. The laminates have a matte finish comprising a notation (drafting) tooth receptive to ink. The composition is then trimmed to size to yield a composition which fully complies with the statute.

BRIEF DESCRIPTION OF THE DRAWINGS

The foregoing features, objects and advantages of the invention will become apparent to those skilled in the art from the following detailed description with references to the following drawings in which like numerals in the several views refer to corresponding parts.

FIG. 1 is a top view of a survey plat document;

FIG. 2 is a cross-section of the survey plat document of FIG. 1;

FIG. 3 is a partial side view of a laminate having a notation (drafting) tooth.

DETAILED DESCRIPTION

Figure 4:
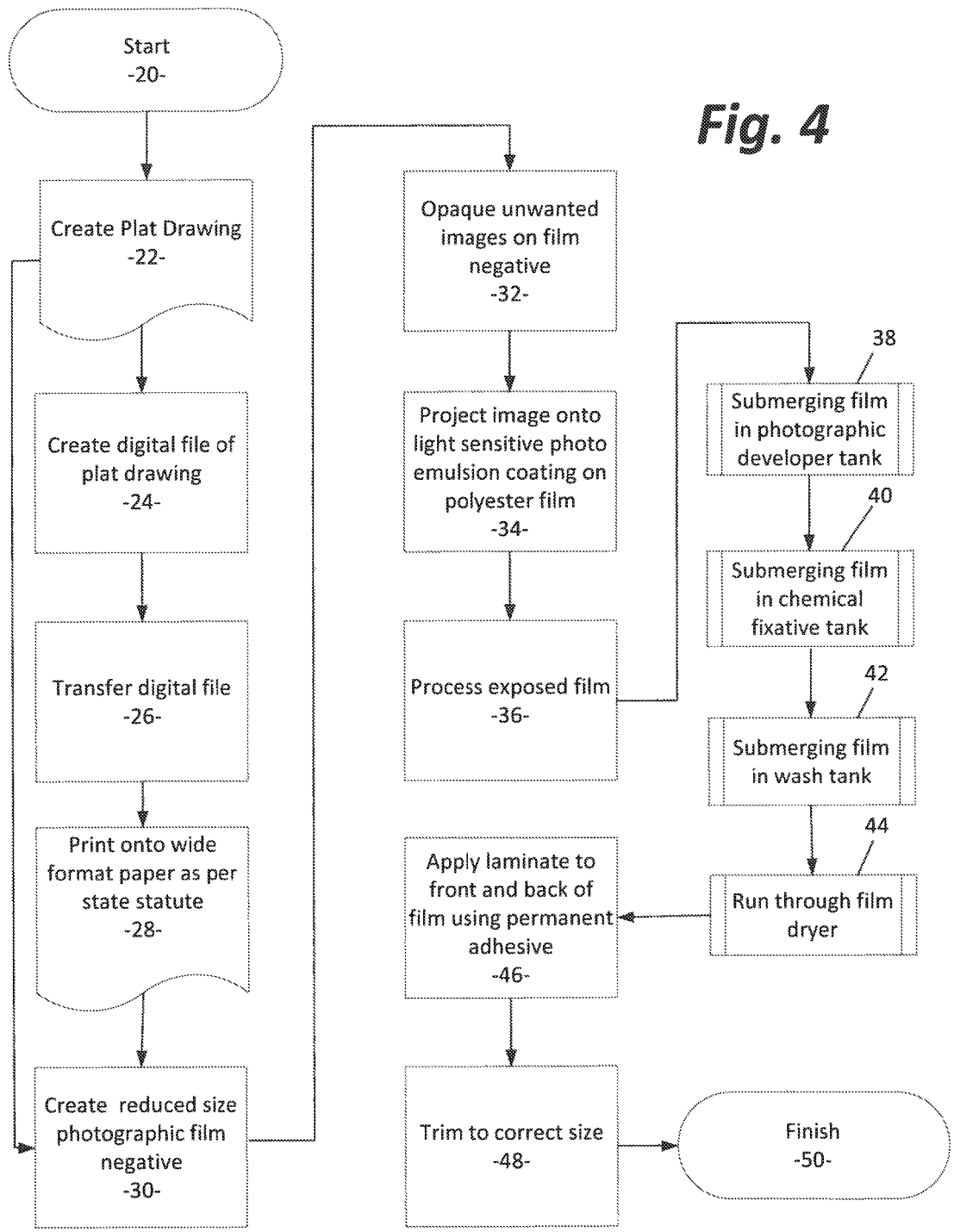
FIG. 4 is a flow chart showing a process for creating the survey plat document of FIG. 1.

This description of the preferred embodiment is intended to be read in connection with the accompanying drawings, which are to be considered part of the entire written description of this invention. In the description, relative terms such as "lower", "upper", "horizontal", "vertical", "above", "below", "up", "down", "top" and "bottom", "under", as well as derivatives thereof (e.g., "horizontally", "downwardly", "upwardly", "underside", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "joined", and "joining" are used interchangeably and refer to one structure or surface being secured to another structure or surface or integrally fabricated in one piece unless expressly described otherwise.

FIGS. 1 and 2 show a survey plat document 1 made in accordance with the present invention. The survey plat document 1 includes opposing left and right side edges 2 and 3, as well as opposing top and bottom edges 14 and 15. The top edge 14 and bottom edge 15 are 22 inches apart and the left edge 2 and right edge 3 are 34 inches apart. These dimensions may be altered without deviating from the invention, but are employed in the embodiment shown to conform with the Minnesota Statute referenced above.

The survey plat document 1 also has front and back surfaces 4 and 6. Front surface 4 and back surface 6 will be spaced so the survey plat document is 4 mil thick to conform with the Minnesota Statute. Again, other thicknesses may be employed without deviating from the invention.

The survey plat document 1 comprises a base layer 8. Base layer 8 is a thin, clear polyester film such as a biaxially-oriented polyethylene terephthalate film (BoPet). BoPet materials are sold by DuPont under the brand name "Mylar". The base layer 8 has a first face 100 and a second face 102. Applied to face 100 of the base layer 8, to form together with the base layer 8 a photo-sensitive film 104, is a light sensitive photo emulsion coating 9. An example of such a coating is a composition comprising light sensitive crystals, such as silver halide crystals, dispersed in gelatin. Various companies including Agfa and Fuji sell films such as film 104. When the coating 9 of the film 104 is exposed to light, the light sensitive crystals are activated. When the film 104 is then processed, an image such as 16 will appear on the clear film 104.

The survey plat document 1 includes two clear (transparent) adhesive layers 10 and 11. Adhesive layer 10 permanently couples the film 104 to a first laminate 12 which forms the front 4 of the plat document 1. More specifically, adhesive layer 10 permanently bonds the laminate 12 to the coating layer 9 to sandwich the coating layer 9 between the laminate 10 and the base layer 8.

Adhesive layer 11 permanently couples face 102 of base layer 8 to a second laminate 14 which forms the back of the plat document 1.

The first laminate 12 and second laminate 14 are each made of a clear polymer film having a matte finish. The laminates 12 and 14 may come with the adhesive layers 9 and 11 pre-applied. In such cases, the laminates 10 and 12 are supplied with a paper backing which is removed at the time the laminates 10 and 12 are applied to the film 104. The laminates 12 and 14 are made of a material and with a finish that allows the laminates to receive and bond with the inks used on stamps such as stamp 17, and signatures and notes written on the document with a pen such as 18. For this purpose, the front and back surfaces 4 and 6 each have a "notation tooth" (sometimes referred to as a "drafting tooth") finish. As illustrated in FIG. 3, the front 4 of laminate 10 has a plurality of interstices 200 which provide this matte, notation tooth finish.

Since preserving the image of the survey plat drawing from harm is of primary importance, the photo emulsion coating 9 selected should be resistant to the damaging effects of ultraviolet (UV) and other forms of light which, in the early days of photo processing, were known to cause fading of photographic images. Many suitable photo emulsions are now available. For added protection against fading of the image 16 due to exposure to light, a UV inhibitor may is imbedded either in the laminates 12 and 14 or in the adhesive layers 10 and 11.

In most cases, the primary purpose of the laminates 12 and 14 is to protect the image from other environmental conditions which may damage the image 16 or from intentional or accidental scratching away of portions of the image. Using two such laminates allows the survey plat document 1 to lay flat and keeps the survey plat document 1 from curling. The laminates 12 and 14 are made of a non-porous polymeric material such as polyvinylchloride (PVC). This material also offers the advantages of being able to accept and bond with the inks which would be typically used to apply stamps such as 17 or signatures and notes such as 18 to the front 4 of back 6 of the survey plat document 1. Such a laminate is made by Oracal USA and sold under the designation Oraguard 290M.

A process for producing the survey plat document is illustrated in FIG. 3. The process starts at step 20 by collecting the survey information necessary to prepare a drawing of the plat. At step 22, a plat drawing is created on a standard piece of paper, preferably sized to conform to the applicable government regulations. If convenient to do so, the drawing created at step 22 may be transferred to a photo processor as represented by the arrow from step 22 to step 30 in FIG. 4.

Alternatively, the drawing created in step 22 can be scanned using a digital scanner or camera to create a digital file of the plat drawing, as shown at step 24. The digital file may be in any suitable file format, such as jpeg, PDF or TIFF. A native raw file format could also be used. At step 26, the digital file is transferred to the photo processor. This can be done by attaching it to an e-mail or uploading it to a server where it can be retrieved by the photo processor. The digital file is then printed onto wide format paper which conforms to the applicable governmental regulations related to size and boarders at step 28.

The paper print created at step 28 is then photographed at step 30 to create a photographic film negative. This may be done using a computer-controlled camera/projector. In some instances, for example due to dust on the camera lens or sensor, there may be imperfections on the negative. The negative is then examined at step 32 and any unwanted images on the film negative are removed by opaquing them from the negative.

At step 34, the same camera/projector may be used to project the image onto film 104 and, more specifically, the light sensitive photo emulsion coating 9 on the polyester base layer 8. The film 104 is then processed at step 36.

Processing step 36 includes substeps 38-44. At step 38, the film 104 is submerged in a tank containing a photographic developer solution which brings out the image, such as image 16, on the film. The film 104 is then submerged in a tank containing a chemical fixative at step 40 to stop the chemical reaction between the developer solution and the emulsion coating 9. At step 40, the film 104 is submerged in a washing tank to wash away the excess developer and fixative from the film. The film 104 now comprising and bearing an image such as image 16 is removed from the washing tank and then dried at step 44 by running them through a dryer. Alternatively, the film can be hung in a suitable manner and left to dry.

Once the film 104 bearing image 16 is dry, step 46 is performed. More specifically, a laminate 12 is applied to the front 100 of the film 104 using a permanent adhesive 10. Laminate 12 is applied over the photographic emulsion coating 9 so that the photographic emulsion coating 9 and the image 16 formed by the coating are sandwiched between laminate 12 and base layer 8. A laminate 14 is applied to the face 102 of the base layer 8 of the film 104 using a permanent adhesive layer 11. The two laminates 12 and 14 may be made of the same material. Both should be moisture impermeable, durable and suitable to project the film 104 and image 16 from scratching, normal wear and environmental conditions. Since the base layer 8 is transparent in most cases, both of laminates 12 and 14 (or alternatively the adhesive layers 10 and 11) may be impregnated with a material that will preclude damaging wavelengths of light (e.g. light in the ultraviolet range) from reaching the image 16 so the image 16 is not degraded by such light. Impregnating the laminates or adhesive layers with such a material will not be necessary if a suitable photo emulsion is used to form the coating 9. As noted above, the laminates 12 and 14 have a matte finish. This will serve to prevent glare in some light conditions making the information contained in image 16 easier to read. The finish is also characterized as having a notation tooth or drafting tooth finish to provide surfaces 4 and 6 which may be written upon or stamped.

At step 48, the survey plat document 1 is trimmed to the correct size. The process is finished at step 50 and the survey plat document 1 is ready for submission to the government or stored. It is during this step 50 that stamps such as 17 and signatures and notes such as 18 are applied to the front surface 4 or back surface 6.

Throughout this specification, terms such as "clear" and "transparent" have been used. Thus, terms reference the fact that the materials or structures referred to permit enough light of wavelengths in the visible range to pass therethrough to permit the image 16 to be viewed. From the foregoing, those skilled in the art will recognize that the materials and structures may be adapted to block light of other wavelengths, such as ultraviolet light, which could damage the image. The materials chosen must permit the image on the film 104 to be viewed through laminate 12, and in some cases, laminate 14, and the adhesive layers 9 and 11 used to bond these laminates to film 104.

The foregoing description is intended to explain the various features and advantages, but is not intended to be limiting. The scope of the invention is defined by the following claims which are also intended to cover a reasonable range of equivalents.

What is claimed is:

1. A survey plat document comprising:
   (a) a base layer having a first face and a second face;
   (b) a photographic emulsion coating permanently bonded to said first face of the base layer and bearing an image of a plat;
   (c) a first transparent laminate over the photographic emulsion coating such that the coating is sandwiched between the base layer and the first transparent laminate;
   (d) a first transparent adhesive layer between said first transparent laminate and the photographic emulsion coating permanently bonding the first transparent laminate to the photographic emulsion coating;
   (e) a second laminate over the second face of the base layer;
   (f) an adhesive layer between said second laminate and the second face of the base layer permanently bonding the second laminate to the base layer;
   wherein said first and second laminate are adapted to protect the image of the plat from being scratched. away and environmental conditions; and
   wherein at least one of the first and second laminates is made from a material and has a notation finish comprising a plurality of interstices allowing said at least one of the first and second laminates to receive and bond with inks used with stamps to stamp the survey plat document and with pens to write signatures and notes on the survey plat document.

2. The survey plat document of claim 1 wherein said base layer is made of a transparent material, and said second laminate is made of a transparentmaterial maerial.

3. The survey plat document of claim 1 wherein said first and second laminates have a matte finish.

4. The survey plat document of claim 1 wherein said first and second laminates are both adapted to bond with inks used to stamp, sign and make notations on the survey plat document.

5. The survey plat document of claim 1 wherein the base layer is made of a polyester material.

6. The survey plat document of claim 1 wherein the base layer is a biaxially-oriented polyethylene terephthalate film.

7. The survey plat document of claim 1 wherein the first and second laminates are each made of a polymeric material.

8. The survey plat document of claim 7 wherein the polymeric material is a polyvinylchloride film.

* * * * *